United States Patent
Wang et al.

(10) Patent No.: US 9,730,252 B2
(45) Date of Patent: Aug. 8, 2017

(54) QUICK CONNECTION BETWEEN CUSTOMIZED SOFTAP AND STA

(71) Applicant: QUALCOMM Incorporated, San Diego, CA (US)

(72) Inventors: Yufeng Wang, San Jose, CA (US); Shi Cong Yang, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 146 days.

(21) Appl. No.: 14/644,485

(22) Filed: Mar. 11, 2015

(65) Prior Publication Data

US 2016/0270129 A1    Sep. 15, 2016

(51) Int. Cl.
| | |
|---|---|
| H04W 76/02 | (2009.01) |
| H04W 48/14 | (2009.01) |
| H04W 48/20 | (2009.01) |
| H04W 84/12 | (2009.01) |

(52) U.S. Cl.
CPC .......... *H04W 76/02* (2013.01); *H04W 48/14* (2013.01); *H04W 48/20* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 8,265,052 B2 | 9/2012 | Abhishek et al. | |
| 9,100,154 B1 * | 8/2015 | Jeffery | H04L 5/005 |
| 2008/0298333 A1 * | 12/2008 | Seok | H04W 8/005 |
| | | | 370/338 |
| 2009/0046657 A1 * | 2/2009 | Kim | H04W 36/005 |
| | | | 370/331 |
| 2009/0111466 A1 * | 4/2009 | Montemurro | H04W 52/0209 |
| | | | 455/434 |
| 2009/0245133 A1 * | 10/2009 | Gupta | H04W 48/14 |
| | | | 370/254 |
| 2010/0165910 A1 * | 7/2010 | Mathews | H04B 7/15528 |
| | | | 370/315 |
| 2011/0085447 A1 * | 4/2011 | Kholaif | H04W 12/04 |
| | | | 370/242 |
| 2012/0106531 A1 * | 5/2012 | Seok | H04B 7/0452 |
| | | | 370/338 |

(Continued)

OTHER PUBLICATIONS

An Empirical Analysis of Heterogeneity in IEEE 802.11 MAC Protocol Implementaions and its Implications.*

(Continued)

*Primary Examiner* — Jay P Patel
(74) *Attorney, Agent, or Firm* — Paradice and Li LLP

(57) ABSTRACT

A method and apparatus for connecting a wireless station (STA) to an access point (AP). The STA broadcasts a probe request that includes a custom information element (IE), and receives probe responses from one or more APs in response to the probe request. The STA then identifies a target AP from the probe responses based at least in part on whether one or more of the received probe responses include the custom IE, and connects to the target AP. For example, the target AP may respond to the probe request by sending a probe response that includes the custom IE. The STA may thus identify a set of candidate APs based on one or more received probe responses that include the custom IE, and select the target AP from the set of candidate APs.

18 Claims, 11 Drawing Sheets

(56) References Cited

U.S. PATENT DOCUMENTS

| | | | |
|---|---|---|---|
| 2012/0177022 A1 | 7/2012 | Ichikawa | |
| 2012/0257536 A1* | 10/2012 | Kholaif | H04W 48/20 370/254 |
| 2013/0155933 A1 | 6/2013 | Kneckt et al. | |
| 2013/0176897 A1 | 7/2013 | Wang et al. | |
| 2013/0208891 A1 | 8/2013 | Kholaif et al. | |
| 2013/0235773 A1* | 9/2013 | Wang | H04W 52/0206 370/311 |
| 2013/0263223 A1* | 10/2013 | Cherian | H04L 9/0869 726/4 |
| 2013/0294232 A1* | 11/2013 | Segev | H04W 28/06 370/230 |
| 2013/0294270 A1* | 11/2013 | Yang | H04W 48/16 370/252 |
| 2013/0294354 A1* | 11/2013 | Zhang | H04W 72/04 370/329 |
| 2013/0304918 A1 | 11/2013 | Kneckt | |
| 2014/0010089 A1* | 1/2014 | Cai | H04W 48/16 370/241 |
| 2014/0287751 A1 | 9/2014 | Lee et al. | |
| 2014/0337950 A1* | 11/2014 | Yang | H04W 12/08 726/7 |
| 2015/0036540 A1* | 2/2015 | Kasslin | H04W 48/18 370/254 |
| 2015/0063111 A1 | 3/2015 | Merlin | |
| 2015/0200811 A1* | 7/2015 | Kasslin | H04L 41/12 370/254 |
| 2015/0245283 A1* | 8/2015 | Park | H04W 48/16 455/434 |
| 2015/0249953 A1* | 9/2015 | Kim | H04W 48/14 370/254 |
| 2015/0282157 A1* | 10/2015 | Kim | H04W 48/14 370/329 |
| 2015/0327158 A1* | 11/2015 | Wentink | H04W 48/16 370/254 |

OTHER PUBLICATIONS

Cornall T., et al., "Improved Handover Performance in Wireless Mobile IPv6", Communication Systems, 2002. ICCS 2002. The 8th International Conference on, XP818629341, Nov. 25-28, 2002, vol. 2, pp. 857-861. ISBN: 978-8-7883-7518-9.
International Search Report and Written Opinion—PCT/US2016/017891—ISA/EPO—Apr. 8, 2015.

* cited by examiner

QUICK CONNECTION BETWEEN CUSTOMIZED SOFTAP AND STA

TECHNICAL FIELD

The present embodiments relate generally to wireless networks, and specifically to reducing a connection time between a wireless station and an access point.

BACKGROUND OF RELATED ART

A Wi-Fi network may be formed by one or more access points (APs) that provide a wireless communication channel or link with a number of client devices or stations (STAs). Establishing a Wi-Fi connection between an AP and a STA typically involves a number of steps that must be completed (in order) before the STA and AP can begin exchanging data with one another. First, the STA scans all available channels (e.g., by broadcasting probe requests and/or listening for beacon frames) to identify APs and/or other devices that are within Wi-Fi communication range. Each available AP may respond to a probe request by sending back a probe response containing basic service set (BSS) information pertaining to that AP's network. Next, the STA selects one of the APs to connect to, based on the associated network information. For example, the STA may select the AP with the highest signal strength. The STA then authenticates and associates with the selected AP. Finally, the STA performs a 4-way handshake with the AP to generate dynamic keys for encrypting (and decrypting) data communicated between the devices.

Once connected, the STA may maintain a communication link with the AP by listening for beacon frames periodically broadcast by the AP. If the STA does not receive a beacon frame from the AP within a given duration, the Wi-Fi connection is lost and the STA may need to reconnect to the AP. However, the process for establishing (or re-establishing) a Wi-Fi connection may take anywhere from 3 to 5 seconds, which may be undesirable for applications that require fast connection times.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

A method and apparatus for reducing a connection time between a wireless station (STA) and an access point (AP) are disclosed. The STA broadcasts a probe request that includes a custom information element (IE). For example, the custom IE may be a vendor-specific IE that includes a media access control (MAC) address of the STA. In an example embodiment, the STA may broadcast the probe request only on a predetermined channel associated with a target AP. The STA receives probe responses from one or more APs in response to the probe request, and identifies the target AP from the probe responses based at least in part on the custom IE. The AP then connects to the target AP.

The target AP may respond to the probe request by sending a probe response that includes the custom IE. Thus, the STA may identify the target AP by scanning the received probe responses for the custom IE. For example, the STA may identify a set of candidate APs based on one or more received probe responses that include the custom IE. The STA may then select the target AP from the set of candidate APs. In addition, the STA may initiate a timer upon broadcasting the probe request. If, upon expiration of the timer, none of the received probe responses include the custom IE, the STA may rebroadcast the probe request with the custom IE.

In an example embodiment, the STA may filter or ignore any probe responses that do not include the custom IE. For example, to further reduce scanning time, the filtering of probe responses may be performed in firmware. The STA may also identify the target AP based at least in part on beacon frames received from the target AP. For example, the target AP may broadcast beacon frames with the custom IE to help maintain and/or re-establish a connection with the STA.

The methods of operation disclosed herein enable a wireless device to quickly establish (and/or re-establish) a Wi-Fi connection with another wireless device. For example, in certain applications, a wireless device may intend to connect only to a particular target device and/or type of device. By broadcasting probe requests with custom IEs, the wireless device may quickly filter out unwanted probe responses (e.g., any probe responses that do not contain a matching custom IE), thereby reducing the number of potential connections the wireless device must analyze during the scanning process.

BRIEF DESCRIPTION OF THE DRAWINGS

The present embodiments are illustrated by way of example and are not intended to be limited by the figures of the accompanying drawings. Like numbers reference like elements throughout the drawings and specification.

DETAILED DESCRIPTION

The example embodiments are described below in the context of Wi-Fi enabled devices for simplicity only. It is to be understood that the example embodiments are equally applicable to other wireless networks (e.g., cellular networks, pico networks, femto networks, satellite networks), as well as for systems using signals of one or more wired standards or protocols (e.g., Ethernet and/or HomePlug/PLC standards). As used herein, the terms "wireless local area network (WLAN)" and "Wi-Fi" can include communications governed by the IEEE 802.11 standards, Bluetooth®, HiperLAN (a set of wireless standards, comparable to the IEEE 802.11 standards, used primarily in Europe), and other technologies used in wireless communications. In addition, although described herein in terms of exchanging data frames between wireless devices, the example embodiments may be applied to the exchange of any data unit, packet, and/or frame between wireless devices.

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present embodiments. However, it will be apparent to one skilled in the art that these specific details may not be required to practice the present embodiments. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. Embodiments of this disclosure are not to be construed as limited to specific examples described herein but rather to include within their scope all embodiments defined by the appended claims.

Figure 1:
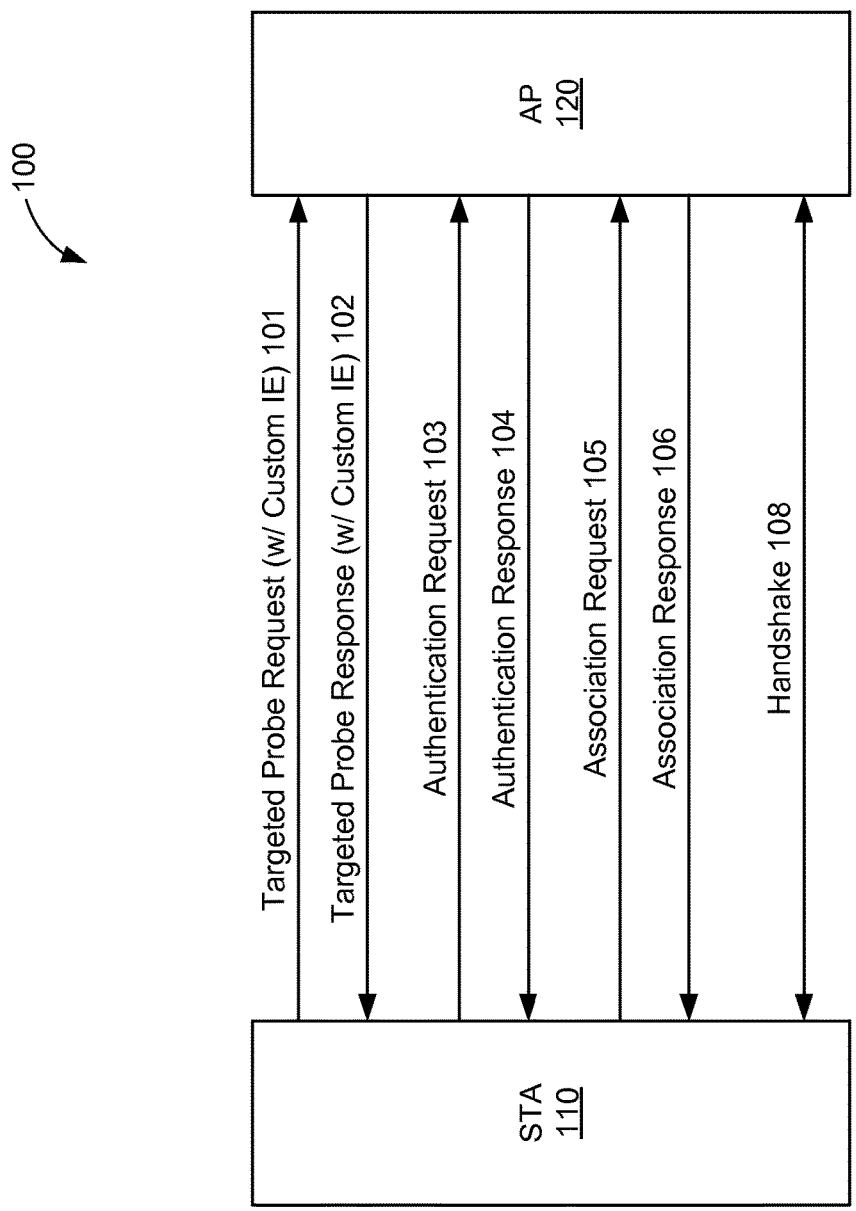
FIG. 1 shows a communications system in accordance with example embodiments.

FIG. 1 shows a communications system 100 in accordance with example embodiments. The system 100 is shown to include a wireless station (STA) 110 and an access point (AP) 120. The STA 110 may be any suitable wireless device including, for example, a cell phone, personal digital assistant (PDA), tablet device, laptop computer, or the like. The AP 120 may be any suitable device that allows one or more wireless devices to connect to a network (e.g., a LAN, WAN, MAN, and/or the Internet) via AP 120 using Wi-Fi, Bluetooth, and/or any other suitable wireless communication standards. In example embodiments, the AP 120 may be any suitable wireless device (e.g., such as a wireless STA) acting as a software-enabled access point ("SoftAP"). Thus, the devices 110 and/or 120 may also be referred to as a user equipment (UE), a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

For example embodiments, each of the devices 110 and 120 may include one or more transceivers, one or more processing resources (e.g., processors and/or ASICs), one or more memory resources, and a power source (e.g., a battery). The memory resources may include a non-transitory computer-readable medium (e.g., one or more nonvolatile memory elements, such as EPROM, EEPROM, Flash memory, a hard drive, etc.) that stores instructions for performing operations described below with respect to FIGS. 8-10. The one or more transceivers may include Wi-Fi transceivers, Bluetooth transceivers, cellular transceivers, and/or other suitable radio frequency (RF) transceivers (not shown for simplicity) to transmit and receive wireless communication signals. Each transceiver may communicate with other wireless devices in distinct operating frequency bands and/or using distinct communication protocols. For example, the Wi-Fi transceiver may communicate within a 2.4 GHz frequency band and/or within a 5 GHz frequency band in accordance with the IEEE 802.11 specification. The cellular transceiver may communicate within various RF frequency bands in accordance with a 4G Long Term Evolution (LTE) protocol described by the $3^{rd}$ Generation Partnership Project (3GPP) (e.g., between approximately 700 MHz and approximately 3.9 GHz) and/or in accordance with other cellular protocols (e.g., a Global System for Mobile (GSM) communications protocol). In other embodiments, the transceivers may be any technically feasible transceiver such as a ZigBee transceiver described by the ZigBee specification, a WiGig transceiver, and/or a HomePlug transceiver described in a specification from the HomePlug Alliance.

In example embodiments, the communications system 100 is a Wi-Fi network (e.g., or wireless local area network (WLAN)) based on one or more IEEE 802.11 protocols, although other wireless communications standards may be employed by the system 100. Thus, to establish a Wi-Fi connection between the STA 110 and the AP 120, the STA 110 may first scan one or more wireless channels to identify the AP 120. In some instances, the STA 110 may intend to connect only to the particular AP 120 (e.g., to the exclusion of any other APs that may be in the vicinity of the STA 110). Thus, in example embodiments, the STA 110 may perform a "filtered scan" for the desired AP 120.

The STA 110 may scan for the AP 120 by broadcasting a targeted probe request 101, intended to cause a unique response by AP 120. For example, the targeted probe request 101 may include a custom information element (IE). The custom IE may be a vendor-specific information element (VSIE) containing information that is uniquely identifiable by the STA 110 (e.g., such as a media access control (MAC) address of the STA 110, a MAC address of the AP 120, and/or other uniquely identifiable information). For example, a probe request associated with current IEEE 802.11 specifications typically includes 150 Bytes of information, including several of the following information fields:

1. Service Set Identifier (SSID)
2. Supported Rates
3. Request Information
4. Extended Supported Rates
5. Direct Sequence Spread Spectrum (DSSS) Parameter Set
6. Supported Operating Classes
7. High Throughput (HT) Capabilities
8. 20/40 Basic Service Set (BSS) Coexistence
9. Extended Capabilities
10. SSID List
11. Channel Usage
12. Interworking
13. Mesh ID
14. Multi-Band
15. Directed Multi-Gigabit (DMG)
16. Multiple MAC Sublayers
17. Very High Throughput (VHT) Capabilities
18. Vendor-Specific Information Elements (VSIEs)

When the AP 120 receives the probe request 101, the AP 120 responds by sending a probe response that mirrors the information provided in the probe request 101 intersected with the capabilities supported by the AP 120. For example, if the probe request 101 contains a selected number (N) of the information fields listed above, the AP 120 may send a targeted probe response 102 including the selected number N of the above-listed information fields when all N fields/ capabilities are supported by the AP 120. For some embodiments, the targeted probe response 102 may include a "matching" custom IE that is substantially similar, if not identical, to the custom IE included in the probe request 101. For example, the AP 120 may detect the custom IE in the received probe request 101 and mirror that custom IE (e.g., the MAC address of the STA 110) in its probe response 102. In example embodiments, the AP 120 may respond to a probe request only if it detects a particular custom IE. Still further, for some embodiments, the STA 110 may filter (e.g., ignore) any received probe responses that do not contain the custom IE that was included in the targeted probe request 101.

Upon receiving the targeted probe response 102, the STA 110 transmits an authentication request 103 the AP 120. For example, the authentication request 103 may trigger a low-level authentication mechanism described by the IEEE 802.11 specification. The AP 120 subsequently responds to the authentication request 103 by sending an authentication response 104 back to the STA 110 to complete the authentication process. Once authenticated, the STA 110 may then send an association request 105 to the AP 120. For example, the association request 105 may include one or more requested capabilities (e.g., under the IEEE 802.11 specification) to be used for communications between the STA 110 and AP 120. If the AP 120 can support the requested capabilities indicated in the association request 105, the AP 120 may create an Association ID (AID) for the STA 110 and send an association response 106 back to the STA 110.

Finally, the STA 110 and the AP 120 may perform a handshake 108 to generate dynamic keys to be used for encrypting and decrypting data communications between the two devices. For example, the handshake 108 may correspond to a 4-way handshake, as described in the IEEE 802.11 specification, whereby the STA 110 and the AP 120 exchange Extensible Authentication Protocol over LAN (EAPoL) frames with one another to generate a pairwise transient key (PTK) to be used for data encryption (and decryption). The STA 110 is connected to the AP 120 once the handshake 108 is completed. In example embodiments, the handshake 108 may be performed in firmware (e.g., as opposed to being performed by the wpa_supplicant in the user space). For example, offloading the handshake 108 to firmware may further reduce the connection time between the STA 110 and the AP 120.

Figure 2A:
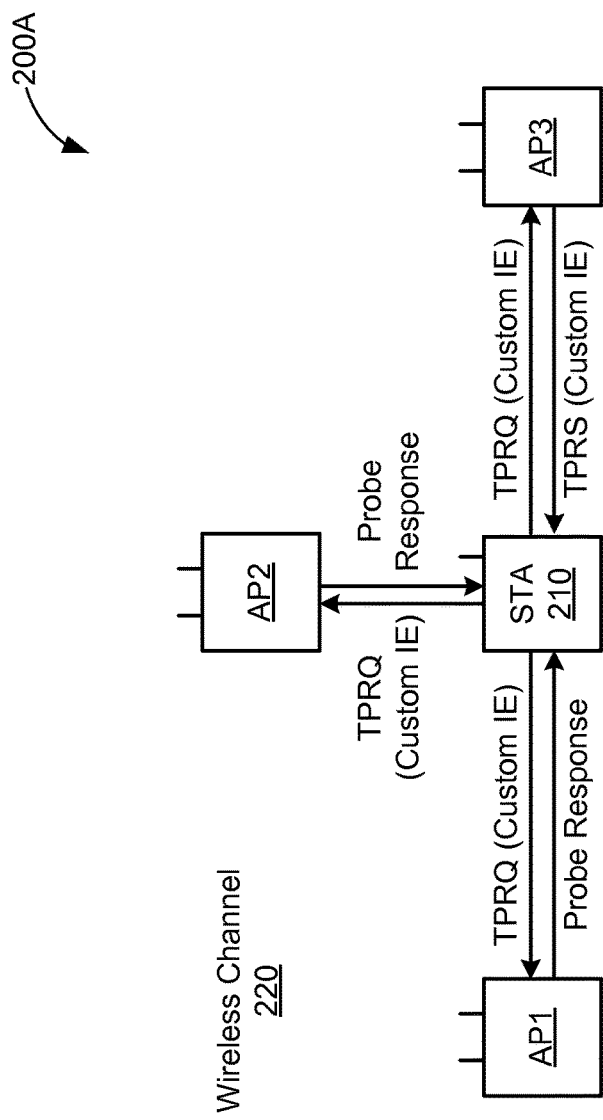
FIGS. 2A and 2B show example communications systems in which filtered scanning operations may be performed.
Figure 2B:
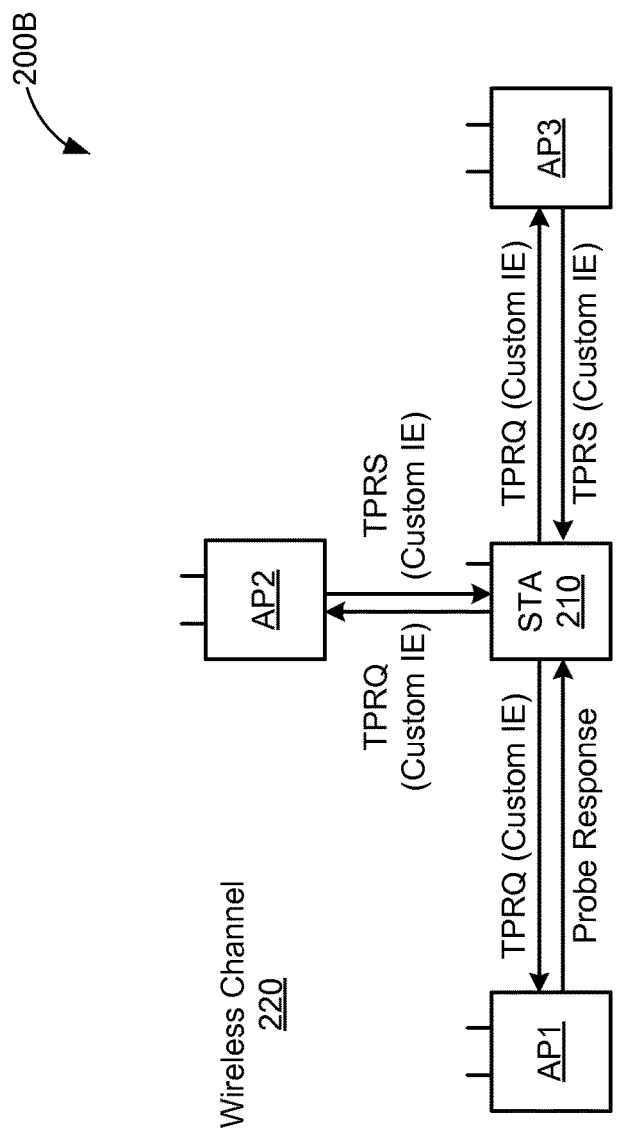

FIGS. 2A and 2B show example communication systems 200A and 200B, respectively, in which filtered scanning operations may be performed. With reference to FIG. 2A, the system 200A is shown to include a STA 210 and a number of access points AP1-AP3 that "reside" (e.g., communicate or otherwise operate) on a wireless channel 220. For purposes of discussion, with respect to the example of FIG. 2A, the STA 210 and AP3 may be the STA 110 and AP 120, respectively, of FIG. 1. Thus, AP3 may be the "target AP" (e.g., the intended target for wireless communications with the STA 210). Each of the remaining access points AP1 and AP2 may be any suitable device that allows one or more wireless devices to connect to a network (e.g., a LAN, WAN, MAN, and/or the Internet) via that AP using Wi-Fi, Bluetooth, and/or any other suitable wireless communication standards.

The STA 210 may initiate a filtered scan operation by broadcasting a targeted probe request (TPRQ) to all available APs residing on the wireless channel 220. In example embodiments, the STA 210 may broadcast the targeted probe request TPRQ on a predetermined channel on which an intended target AP is known to reside. For example, AP3 may be preconfigured to operate on wireless channel 220. Thus, to reduce scanning time, the STA 210 may scan only the wireless channel 220 for the target AP (e.g., as opposed to scanning all available channels under conventional Wi-Fi scanning operations). As described above, the targeted probe request TPRQ may include a custom IE (e.g., storing the MAC address of the STA 210) which may be used to filter received probe responses.

Each of the access points AP1-AP3 responds to the targeted probe request TPRQ by sending a probe response that mirrors the information provided in the probe request intersected with the capabilities supported by that AP. In the example of FIG. 2A, only AP3 may mirror the custom IE field of the targeted probe request TPRQ. For example, AP3 may be preconfigured to associate with the particular STA 210 and/or a particular class or type of device to which STA 210 belongs. In contrast, AP1 and AP2 may be generic access points and/or may not be specifically configured to associate with STA 210. Accordingly, AP3 may send a targeted probe response (TPRS) with a custom IE that mirrors the custom IE of the targeted probe request TPRQ, whereas the remaining access points AP1 and AP2 send non-targeted probe responses (e.g., without the custom IE) back to the STA 210.

In example embodiments, the STA 210 may filter the received probe responses based on the custom IE. For example, to reduce the duration of the scanning process, the STA 210 may ignore or filter any probe responses that do not contain the custom IE (e.g., such as the probe responses transmitted by AP1 and AP2). For example, during conventional Wi-Fi scanning operations, a STA typically analyzes its received probe responses to select an access point (e.g., network) with the most favorable conditions and/or capabilities to connect to. By filtering incoming probe responses from non-targeted (e.g., "unwanted") APs, the STA 210 may significantly reduce the number of network connections to be analyzed during the filtered scanning operation. This, in turn, may substantially reduce the time needed to establish a Wi-Fi connection with the target AP (e.g., AP3). For some embodiments, the filtering of probe responses may be performed in firmware (e.g., to further reduce the scanning time by limiting any delays that may be caused by the reception of such probe responses).

The STA 210 may identify AP3 as the target AP based on the custom IE included in the targeted probe response TPRS, and may subsequently establish a Wi-Fi connection with AP3 based at least in part on information included in the probe response TPRS (e.g., as described above with respect to FIG. 1). For example, the STA 210 may send an authentication request to AP3 upon determining that the custom IE included in the targeted probe response TPRS matches or mirrors the custom IE included in the targeted probe request TPRQ. For some embodiments, the STA 210 may attempt to connect to the first AP from which it receives a targeted probe response TPRS. For other embodiments, the STA 210 may wait a given duration before analyzing any received targeted probe responses TPRSs (e.g., in case multiple APs send targeted probe responses TPRSs).

After a Wi-Fi connection is established between AP3 and the STA 210, AP3 may broadcast beacon frames containing the custom IE to enable the STA 210 to maintain its connection to AP3. Furthermore, if the connection between the STA 210 and AP3 is inadvertently lost (e.g., due to poor channel conditions and/or movement of either of the devices), the beacon frames may also enable the STA 210 to quickly re-establish a connection to AP3 (e.g., without having to actively scan for AP3 by broadcasting targeted probe requests TPRQs). For example, during a passive scanning operation, the STA 210 may again identify the target AP (e.g., AP3) based on whether the beacons include the custom IE. More specifically, the STA 210 may filter any incoming beacons that do not contain a custom IE that matches or mirrors the custom IE of the STA 210 (e.g., included in the targeted probe request TPRQ), while focusing only on received beacons that contain the custom IE.

In an example embodiment, the STA 210 may initiate a scan timer upon broadcasting the targeted probe request TPRQ. For example, in some instances, the target AP (e.g., AP3) may fail to receive the targeted probe request TPRQ sent by the STA 210 (e.g., due to interference and/or other channel conditions), or the STA 210 may fail to receive the targeted probe response TPRS from the target AP. Accordingly, the STA 210 may rebroadcast the targeted probe request TPRQ if it does not detect any targeted probe responses TPRSs by the expiration of the scan timer. Thus, the scan timer may be used to ensure that the STA 210 does not dwell on the wireless channel 220 beyond a threshold duration of time before rescanning the channel 220 for the target AP (e.g., to further reduce the duration of the filtered scanning operation). The scan timer may also be used to set an overall duration for each scanning operation. For example, the STA 210 may continue to listen for incoming probe responses (e.g., even after receiving at least one targeted probe response TPRS) until expiration of the scan timer.

With reference to FIG. 2B, the communications system 200B is shown to include STA 210 and access points AP1-AP3 residing on wireless channel 220. For purposes of discussion, with respect to the example of FIG. 2B, AP2 and AP3 may each correspond to AP 120 of FIG. 1. For example, AP2 together with AP3 may form a wireless local area network (WLAN) according to the IEEE 802.11 family of standards. Thus, the STA 210 may target AP2 and/or AP3 to establish a wireless connection. The remaining access point AP1 may be any suitable device that allows one or more wireless devices to connect to a network (e.g., a LAN, WAN, MAN, and/or the Internet) via the AP using Wi-Fi, Bluetooth, and/or any other suitable wireless communication standards.

As described above, with respect to FIG. 2A, the STA 210 may initiate a filtered scan operation by broadcasting a targeted probe request TPRQ to all available APs residing on the wireless channel 220. The targeted probe request TPRQ may include a custom IE (e.g., storing a MAC address of the STA 210) which may be used to filter received probe responses. In the example of FIG. 2B, AP2 and AP3 may mirror the custom IE field of the targeted probe request TPRQ, whereas AP1 may not mirror the custom IE. Accordingly, both AP2 and AP3 may send targeted probe responses TPRSs with custom IEs that mirror the custom IE of the targeted probe request TPRQ. In contrast, AP1 may send a non-targeted probe response (e.g., without the custom IE) back to the STA 210.

The STA 210 may filter or ignore the probe response from AP1 upon determining that the probe response does not contain the custom IE. As described above, the filtering of incoming probe responses may be performed in firmware of the STA 210. In example embodiments, the STA 210 may listen for incoming probe requests for a given duration to ensure that it receives the targeted probe responses TPRSs from both AP2 and AP3. For example, the STA 210 may initiate a scan timer upon broadcasting the targeted probe request TPRQ and continue listening for incoming probe requests until the scan timer expires.

Once the scan timer expires, the STA 210 may analyze any (and all) targeted probe responses TPRSs received during the scanning operation, and may select a particular AP to connect to (e.g., from a subset of candidate APs) based on the received probe responses. For example, the STA 210 may select either AP2 or AP3 to connect to (e.g., AP1 is removed from consideration as a result of filtering) depending on the capabilities and/or channel conditions associated with each access point. If AP2 and AP3 are both viable candidates that offer substantially similar capabilities, the STA 210 may select the AP with the highest signal strength (e.g., as indicated by an RSSI value) to establish a Wi-Fi connection with.

In example embodiments, after the STA 210 establishes a Wi-Fi connection with one of the access points AP2 or AP3, both AP2 and AP3 may broadcast beacon frames containing the custom IE. For example, if STA 210 initially establishes a Wi-Fi connection with AP2 and subsequently moves out of wireless range of AP2, but remains in range of AP3, the STA 210 may quickly identify and establish a connection with AP3 based on the custom IE included in its beacon frames. In this manner, the STA 210 may quickly reconnect to the WLAN (e.g., formed by AP2 and AP3) without having to initiate another active scanning operation.

Figure 3:
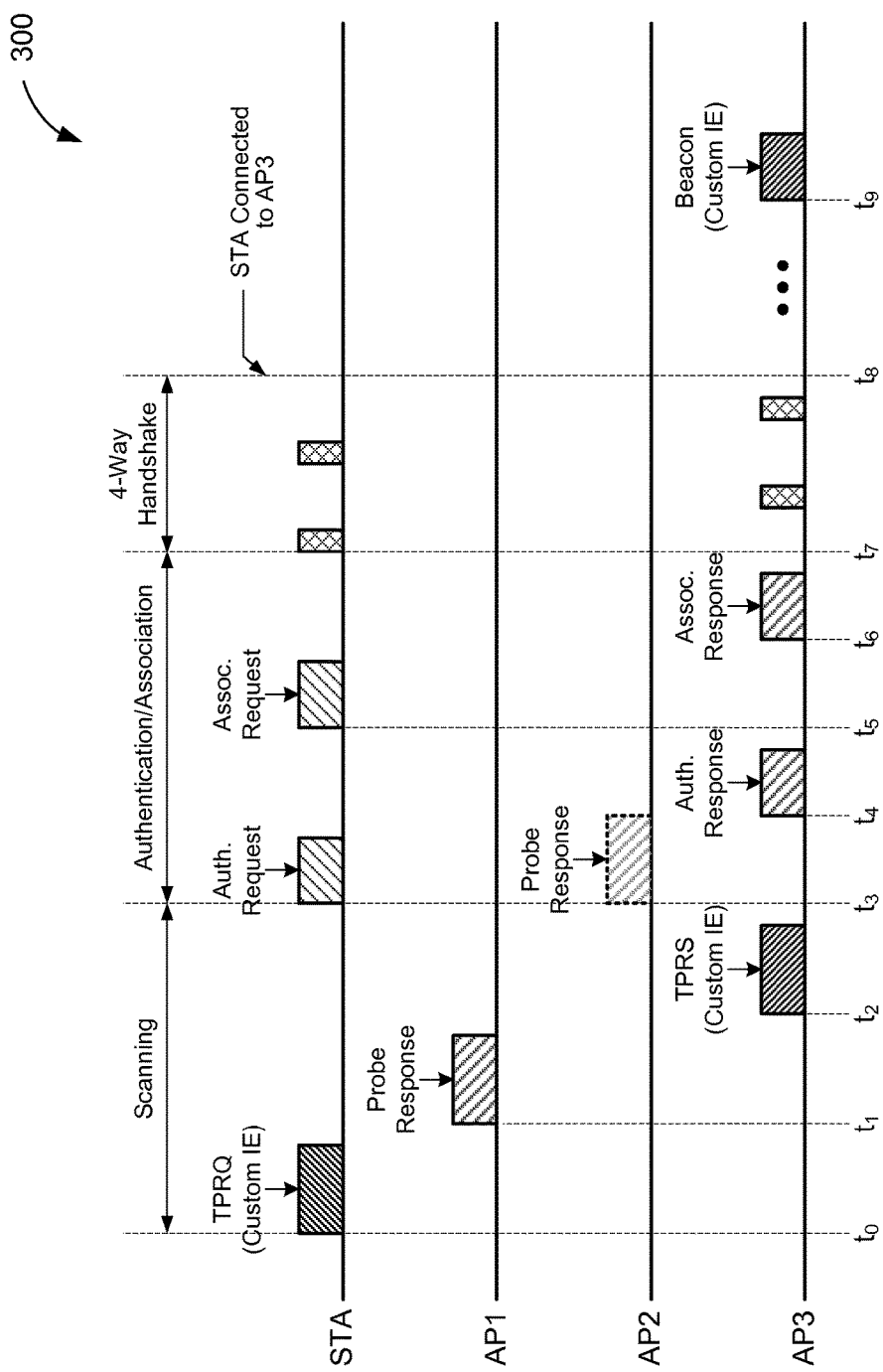
FIG. 3 shows an example timing diagram depicting a wireless connection operation with filtered scanning for access points (APs).

FIG. 3 shows an example timing diagram 300 depicting a wireless connection operation with filtered scanning for APs. For purposes of discussion herein, the STA and access points AP1-AP3 may be STA 210 and access points AP1-AP3, respectively, of FIG. 2A. For example, of the multiple access points AP1-AP3, only AP3 may be targeted by the STA during a filtered scanning operation.

The STA initiates a filtered scanning operation by broadcasting a targeted probe request TPRQ at time $t_0$. As described above, the targeted probe request TPRQ may include a custom IE (e.g., which may be a VSIE containing a MAC address of the STA) that may be used to filter incoming probe responses. The available access points AP1-AP3 may respond to the targeted probe request TPRQ by sending either a "standard" (e.g., non-targeted) probe response or a targeted probe response TPRS back to the STA.

For example, AP1 may send a standard probe response to the STA at time $t_1$. Because this probe request does not contain the STA's custom IE, it may be filtered or ignored by the STA. At time $t_2$, AP3 sends a targeted probe response TPRS to the STA. The targeted probe response TPRS may include a custom IE that matches or mirrors the custom IE provided with the targeted probe request TPRQ. Upon detecting a targeted probe response TPRS with the custom IE, the STA may terminate the scanning operation and initiate authentication and association procedures with AP3 at time $t_3$.

In example embodiments, the STA may terminate the scanning operation in response to the first targeted probe response TPRS it receives (e.g., even if other APs have not yet responded to the targeted probe request TPRQ). For example, as shown in FIG. 3, the STA initiates an authentication process with AP3, at time $t_3$, without waiting for AP2 to send a probe response. Terminating the scanning operation as soon as the STA receives a targeted probe response TPRS may significantly reduce the time needed to establish a Wi-Fi connection with a target AP (e.g., AP3). Moreover, because AP3 is the only target AP in this example, it would not be advantageous for the STA to continue listening for probe responses after receiving the targeted probe response TPRS from AP3 (e.g., since any subsequent probe responses would not contain the custom IE, and would therefore be filtered anyway).

To establish a Wi-Fi connection with the target AP (e.g., AP3), the STA sends an authentication request to AP3 at time $t_3$, and AP3 sends an authentication response back to the STA at time $t_4$. The exchange of authentication information (e.g., from time $t_3$ to $t_4$) may correspond with a low-level authentication process described by the IEEE 802.11 specification. The STA then sends an association request to AP3 at time $t_5$, and AP3 sends an association response back to the STA at time $t_6$. During the association process (e.g., from time $t_5$ to $t_6$), the STA and AP3 negotiate one or more capabilities to be used for subsequent wireless communications. Once the devices are associated with one another, the STA and AP3 may perform a 4-way handshake, from time $t_7$ to $t_8$, to complete the connection process. For example, the STA and AP3 may exchange EAPoL frames with one another to generate a PTK to be used for encrypting (and decrypting) data communicated between the two devices.

At time $t_9$ (and periodically thereafter), AP3 may broadcast a beacon frame containing the custom IE. The beacon frame may be used by AP3 to announce its presence and to indicate to the STA that the Wi-Fi connection is still "alive." Additionally, the custom IE included in the beacon frame may enable the STA to quickly identify AP3 during passive scanning operations. For example, the STA may passively scan the wireless channel (e.g., even while connected to AP3) by receiving beacon frames broadcast by APs operating on the channel. During conventional passive scanning operations, a STA may analyze all of the received beacon frames and connect to any AP that provides a better connection (e.g., stronger RSSI value, greater bandwidth, better QoS, etc.) than the current AP. However, in example embodiments, the STA may filter any incoming beacon frames that do not contain the custom IE (e.g., any beacon frames not originating from AP3). This may reduce the time needed for the STA to identify and reconnect to AP3 in the event that the devices become disconnected.

Figure 4:
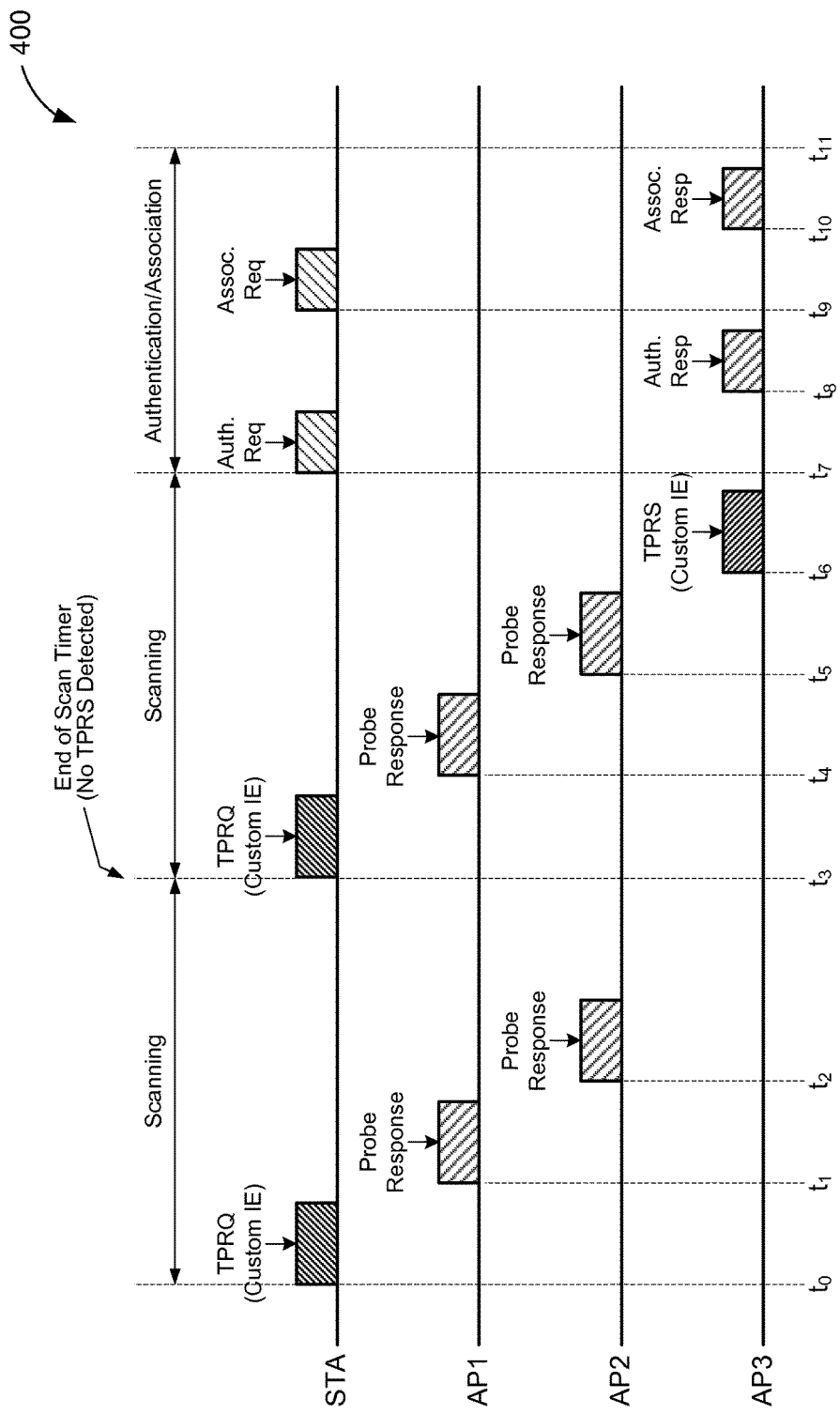
FIG. 4 shows an example timing diagram depicting a wireless connection operation with filtered re-scanning for APs.

FIG. 4 shows an example timing diagram 400 depicting a wireless connection operation with filtered re-scanning for APs. For purposes of discussion herein, the STA and access points AP1-AP3 may be STA 210 and access points AP1-AP3, respectively, of FIG. 2A. For example, of the multiple access points AP1-AP3, only AP3 may be targeted by the STA during a filtered scanning operation.

The STA initiates a filtered scanning operation by broadcasting a targeted probe request TPRQ at time $t_0$. As described above, the targeted probe request TPRQ may include a custom IE (e.g., which may be a VSIE containing a MAC address of the STA) that may be used to filter incoming probe responses. The available access points AP1-AP3 may respond to the targeted probe request TPRQ by sending either a standard probe response or a targeted probe response TPRS back to the STA. In example embodiments, the STA may initiate or activate a scan timer upon broadcasting the targeted probe request TPRQ. For example, the scan timer may be used to limit the duration of the scanning operation. Moreover, the scan timer may reduce the overall duration of the scanning operation by ensuring that the STA does not wait too long for a targeted probe response TPRS before actively rescanning the wireless channel.

AP1 sends a standard probe response to the STA at time $t_1$. Because this probe response does not contain a custom IE that matches or mirrors the custom IE in the targeted probe request TPRQ, AP1's probe response may be filtered or ignored by the STA. AP2 sends a standard probe response to the STA at time $t_2$. Because this probe response also does not contain a matching custom IE, AP2's probe response may also be filtered or ignored by the STA. In the example of FIG. 4, the STA may not receive a probe response from AP3 before the scan timer expires, at time $t_3$. For example, AP3 may have failed to receive the targeted probe request TPRQ sent by the STA, or the STA may have failed to receive a targeted probe response TPRS sent by AP3 (e.g., due to distance, interference, and/or other channel conditions).

When the scan timer expires, at time $t_3$, the STA determines that it has not yet received a targeted probe response TPRS (e.g., containing a matching custom IE) from any of the access points AP1-AP3. Accordingly, the STA may initiate another filtered scanning operation by re-broadcasting the targeted probe request TPRQ at time $t_3$. This time, AP1 responds with a standard probe response at time $t_4$, AP2 responds with a standard probe response at time $t_5$, and AP3 responds with a targeted probe response TPRS that includes a matching custom IE at time $t_6$. Upon detecting the targeted probe response TPRS with the matching custom IE, the STA may terminate the scanning operation and initiate authentication and association procedures with AP3 at time $t_7$.

To establish a Wi-Fi connection with the target AP (e.g., AP3), the STA sends an authentication request to AP3 at time $t_7$, and AP3 sends an authentication response back to the STA at time $t_8$. Once authenticated, the STA sends an association request to AP3 at time $t_9$, and AP3 sends an association response back to the STA at time $t_{10}$. Finally, the devices may perform a 4-way handshake (not shown for simplicity) at time $t_{11}$ to complete the connection process.

Figure 5:
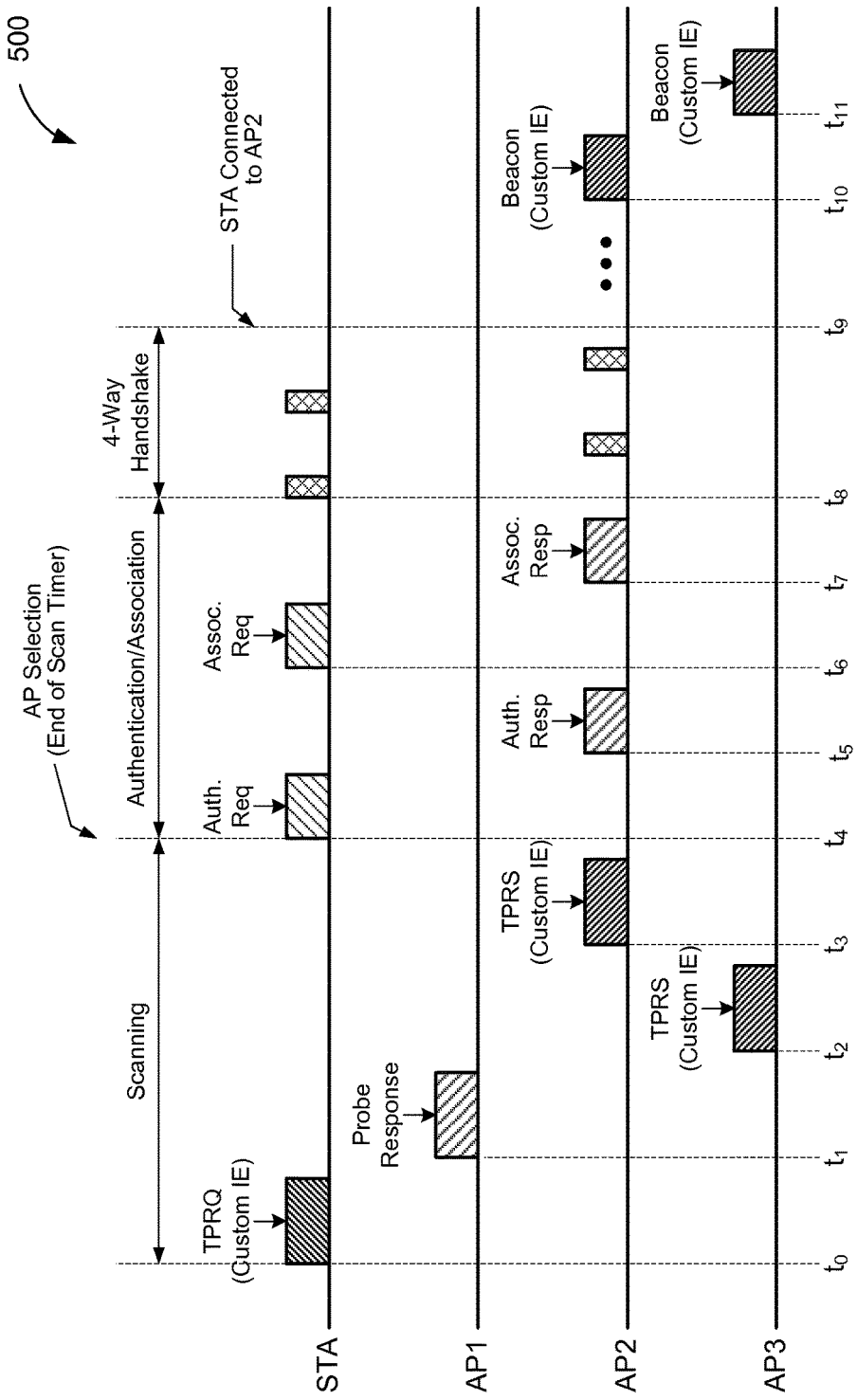
FIG. 5 shows an example timing diagram depicting a wireless connection operation with filtered AP selection.

FIG. 5 shows an example timing diagram 500 depicting a wireless connection operation with filtered AP selection. For purposes of discussion herein, the STA and access points AP1-AP3 may be STA 210 and access points AP1-AP3, respectively, of FIG. 2B. For example, AP2 and/or AP3 may be targeted by the STA during a filtered scanning operation.

The STA initiates a filtered scanning operation by broadcasting a targeted probe request TPRQ at time $t_0$. As described above, the targeted probe request TPRQ may include a custom IE (e.g., which may be a VSIE containing a MAC address of the STA) that may be used to filter incoming probe responses. The available access points AP1-AP3 may respond to the targeted probe request TPRQ by sending either a standard probe response or a targeted probe response TPRS back to the STA. In example embodiments, the STA may initiate or activate a scan timer upon broadcasting the targeted probe request TPRQ. For example, the scan timer may be used to limit the duration of the scanning operation while ensuring that the STA has sufficient time to receive a number of targeted probe responses TPRSs (if available).

AP1 sends a standard probe response to the STA at time $t_1$. Because this probe response does not contain a custom IE that matches or mirrors the custom IE in the targeted probe request TPRQ, AP1's probe response may be filtered or ignored by the STA. AP3 sends a targeted probe response TPRS with the matching custom IE to the STA at time $t_2$. Because the targeted probe response TPRS contains the matching custom IE, the STA may store information about AP3 (e.g., acquired from the targeted probe response TPRS) in a database of candidate APs. In example embodiments, the STA may continue listening for probe responses (e.g., until the scan timer expires) even after receiving the targeted probe response TPRS from AP3.

As described above, with respect to FIG. 2B, a WLAN may be formed by multiple APs (e.g., such as AP2 and AP3).

In some instances, the first AP to send a targeted probe response TPRS to the STA may not provide the best connection to the WLAN. Thus, it may be advantageous for the STA to receive multiple targeted probe responses TPRSs (when available) and select a target AP that provides the best connection to the WLAN.

For example, AP2 may also send a targeted probe response TPRS with the matching custom IE, at time $t_3$. Because the targeted probe response TPRS contains the matching custom IE, the STA may also store information pertaining to AP2 (e.g., acquired from the targeted probe response TPRS) in a database of candidate APs. Thus, when the scan timer expires (e.g., at time $t_4$), the STA may analyze the information for all of the APs in the database of candidate APs and select a particular AP to connect to. In this example, AP2 may be closest in vicinity to the STA and may therefore provide the highest signal strength (e.g., as indicated by an RSSI value). Accordingly, the STA may choose to establish a Wi-Fi connection with AP2 (e.g., even though the STA first received a targeted probe response TPRS from AP3).

To establish a Wi-Fi connection with the target AP (e.g., AP2), the STA sends an authentication request to AP2 at time $t_4$, and AP2 sends an authentication response back to the STA at time $t_5$. Once authenticated, the STA sends an association request to AP2 at time $t_6$, and AP2 sends an association response back to the STA at time $t_7$. Finally, the STA and AP2 may perform a 4-way handshake, from time $t_8$ to $t_9$, to complete the connection process.

At time $t_{10}$ (and periodically thereafter), AP2 may broadcast a beacon frame containing the custom IE. The beacon frame may be used to maintain the Wi-Fi connection between the STA and AP2. As described above, the beacon frame may also enable the STA to quickly identify and reconnect to AP2 in the event that the devices become disconnected. In example embodiments, any APs forming part of the WLAN to which the STA is connected may subsequently broadcast beacon frames with the custom IE. For example, at time $t_{11}$ (and periodically thereafter), AP3 may also broadcast a beacon frame containing the custom IE. This allows the STA to quickly identify AP3 when passively scanning the wireless channel. Thus, if the STA subsequently moves out of wireless range with AP2, while remaining in range of AP3, the STA may remain connected to (e.g., or quickly reconnect to) the WLAN by establishing a Wi-Fi connection with AP3.

Figure 6:
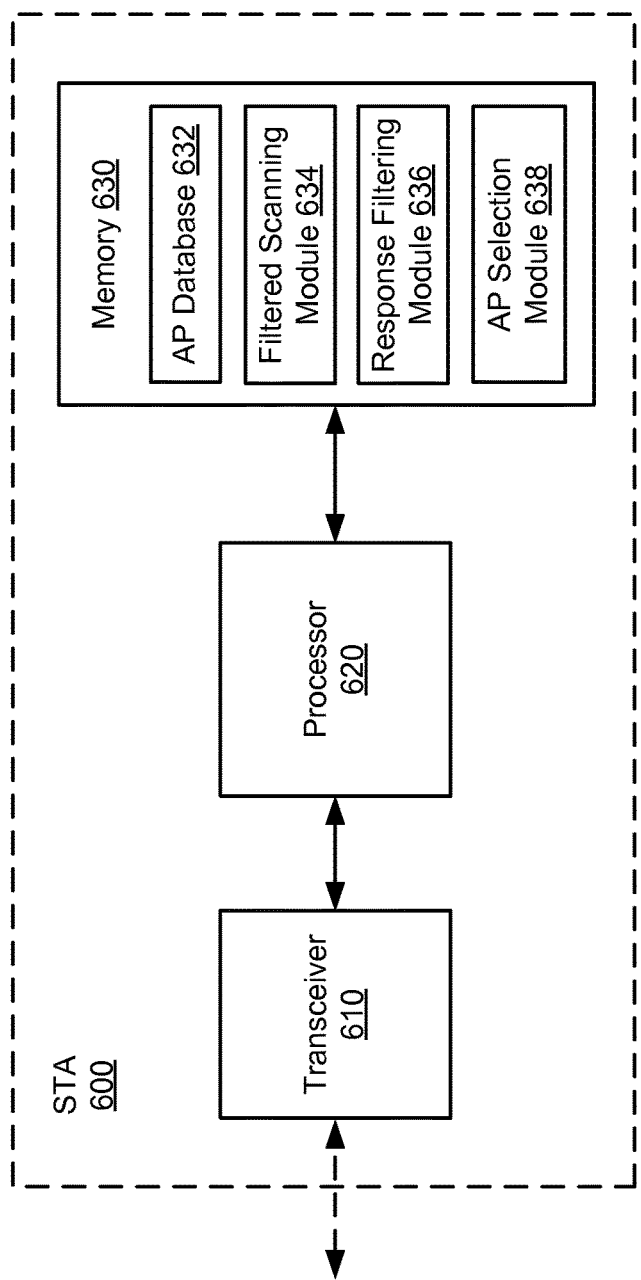
FIG. 6 shows a wireless station (STA) in accordance with example embodiments.

FIG. 6 shows a STA 600 in accordance with example embodiments. STA 600 may be one embodiment of STA 110 of FIG. 1. STA 600 includes at least a transceiver 610, a processor 620, and a memory 630. The transceiver 610 may be used to communicate wirelessly with other suitable wireless devices (e.g., including wires access points and/or wireless stations). Processor 620, which is coupled to transceiver 610 and memory 630, may be any suitable one or more processors capable of executing scripts or instructions of one or more software programs stored in the STA 600 (e.g., within memory 630). For purposes of discussion herein, processor 620 is shown in FIG. 6 as being coupled between transceiver 610 and memory 630. For actual embodiments, transceiver 610, processor 620, and/or memory 630 may be connected together using one or more buses (not shown for simplicity).

Memory 630 may include an AP database 632 that stores information pertaining to a set of candidate APs. For example, the AP database 632 may be updated each time the STA 600 receives a targeted probe response (e.g., with a custom IE) from a potential target AP. The AP database 632 may be populated with information included in each targeted probe response. Memory 630 may also include a non-transitory computer-readable medium (e.g., one or more non-volatile memory elements, such as EPROM, EEPROM, Flash memory, a hard drive, etc.) that may store the following software modules:
  a filtered scanning module 634 to scan a wireless channel using a custom IE to identify a set of candidate APs;
  a response filtering module 636 to selectively filter incoming probe responses based at least in part on whether the probe responses contain the custom IE; and
  an AP selection module 638 to select a target AP to connect to from the set of candidate APs.

Each software module includes instructions that, when executed by processor 620, causes the STA 600 to perform the corresponding functions. The non-transitory computer-readable medium of memory 630 thus includes instructions for performing all or a portion of the operations described below with respect to FIGS. 8 and 9.

For example, processor 620 may execute the filtered scanning module 634 to scan a wireless channel using a custom IE to identify a set of candidate APs. Processor 620 may also execute the response filtering module 636 to selectively filter incoming probe responses based at least in part on whether the probe responses contain the custom IE. Further, processor 620 may execute the AP selection module 638 to select a target AP to connect to from the set of candidate APs.

Figure 7:
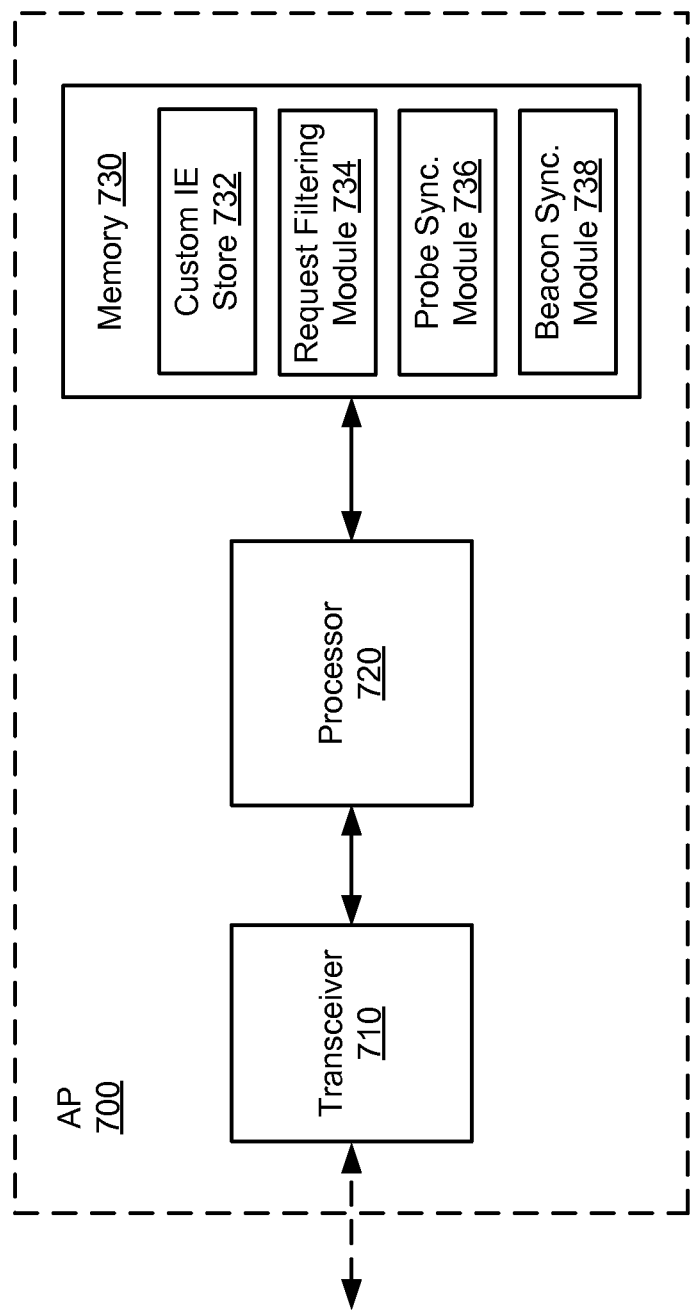
FIG. 7 shows a wireless AP in accordance with example embodiments.

FIG. 7 shows an AP 700 in accordance with example embodiments. AP 700 may be one embodiment of AP 120 of FIG. 1. AP 700 includes at least a transceiver 710, a processor 720, and a memory 730. The transceiver 710 may be used to communicate wirelessly with other suitable wireless devices (e.g., including wireless access points and/or wireless stations). Processor 720, which is coupled to transceiver 710 and memory 730, may be any suitable one or more processors capable of executing scripts or instructions of one or more software programs stored in the AP 700 (e.g., within memory 730). For purposes of discussion herein, processor 720 is shown in FIG. 7 as being coupled between transceiver 710 and memory 730. For actual embodiments, transceiver 710, processor 720, and/or memory 730 may be connected together using one or more buses (not shown for simplicity).

Memory 730 may include a custom IE store 732 that stores information contained in a custom IE of a targeted probe request received from a STA. For example, upon receiving a targeted probe request, the AP 700 may parse the information included in the custom IE field and store the information in the custom IE store 732. Memory 730 may also include a non-transitory computer-readable medium (e.g., one or more non-volatile memory elements, such as EPROM, EEPROM, Flash memory, a hard drive, etc.) that may store the following software modules:
  a request filtering module 734 to filter incoming probe requests that do not contain a custom IE;
  a probe synchronization module 736 to generate a targeted probe response with a custom IE that matches or mirrors the custom IE of a received targeted probe request; and
  a beacon synchronization module 738 to generate beacon frames containing the custom IE.

Each software module includes instructions that, when executed by processor 720, causes the AP 700 to perform the corresponding functions. The non-transitory computer-readable medium of memory 730 thus includes instructions for performing all or a portion of the operations described below with respect to FIG. 10.

For example, processor 720 may execute the request filtering module 734 to filter incoming probe requests that do not contain a custom IE. Processor 720 may also execute the probe synchronization module 736 to generate a targeted probe response with a custom IE that matches or mirrors the custom IE of a received targeted probe request. Further, processor 720 may execute the beacon synchronization module 738 to generate beacon frames containing the custom IE.

Figure 8:
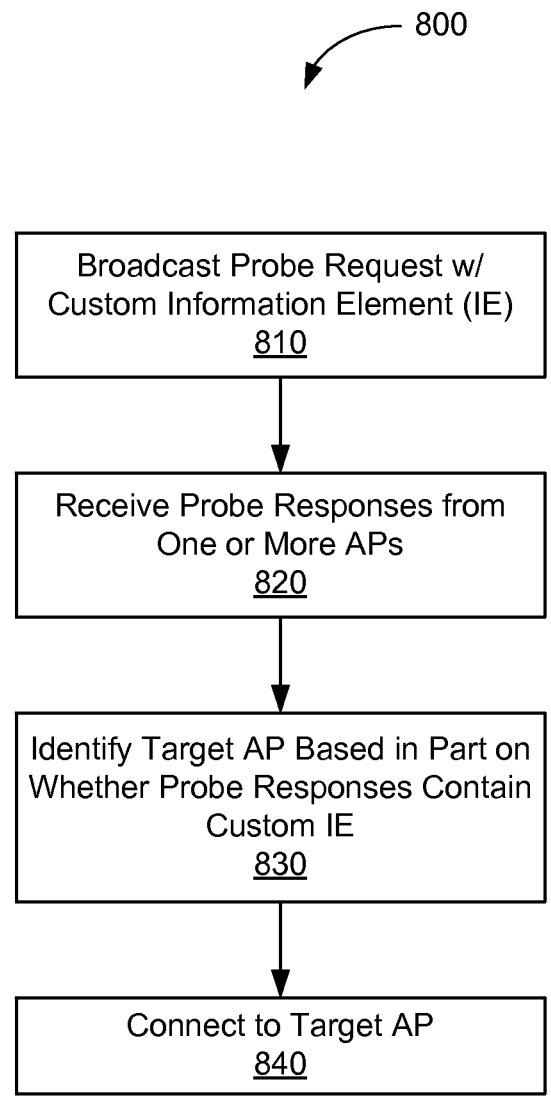
FIG. 8 shows a flowchart depicting an example filtered scanning operation.

FIG. 8 shows a flowchart depicting an example filtered scanning operation 800. With reference, for example, to FIG. 1, the example operation 800 may be performed by the STA 110 to identify and connect to a target AP (e.g., AP 120). The STA 110 initiates the filtered scanning operation 800 by broadcasting a probe request 101 with a custom IE (810). For example, the custom IE may be a VSIE containing information that is unique to the STA 110 (e.g., such as a MAC address of the STA 110). The STA 110 then receives probe responses from one or more APs in the vicinity (820). For example, each AP that receives the probe request may send a probe response back to the STA that mirrors the information provided in the probe request intersected with the capabilities supported by that AP.

The STA 110 may identify the target AP (e.g., AP 120) from the one or more received probe responses, based at least in part on whether the prone responses contain the custom IE (830). In example embodiments, the target AP 120 sends a probe response 102 that includes a custom IE matching or mirroring the custom IE included in the probe request. In contrast, other APs may send standard probe responses (e.g., that do not contain the custom IE) back to the STA 110. This allows the STA 110 to quickly distinguish probe responses originating from the AP 120 from other incoming probe responses. In example embodiments, the STA 110 may filter any incoming probe responses that do not contain the custom IE (e.g., to further reduce the overhead necessary to complete the filtered scanning operation 800).

Once the STA 110 has identified (and selected) the target AP, the STA 110 may proceed to establish a Wi-Fi connection with the target AP (840). For example, the STA 110 may authenticate to the AP 120 by sending an authentication request 103 to, and receiving an authentication response 104 back from, the AP 120. The STA 110 may then associate to the AP 120 by sending an association request 105 to, and receiving an association response 106 back from, the AP 120. Finally, the STA 110 and AP 120 may complete the connection process by performing a 4-way handshake 108 (e.g., by exchanging EAPoL frames between the devices).

Figure 9:
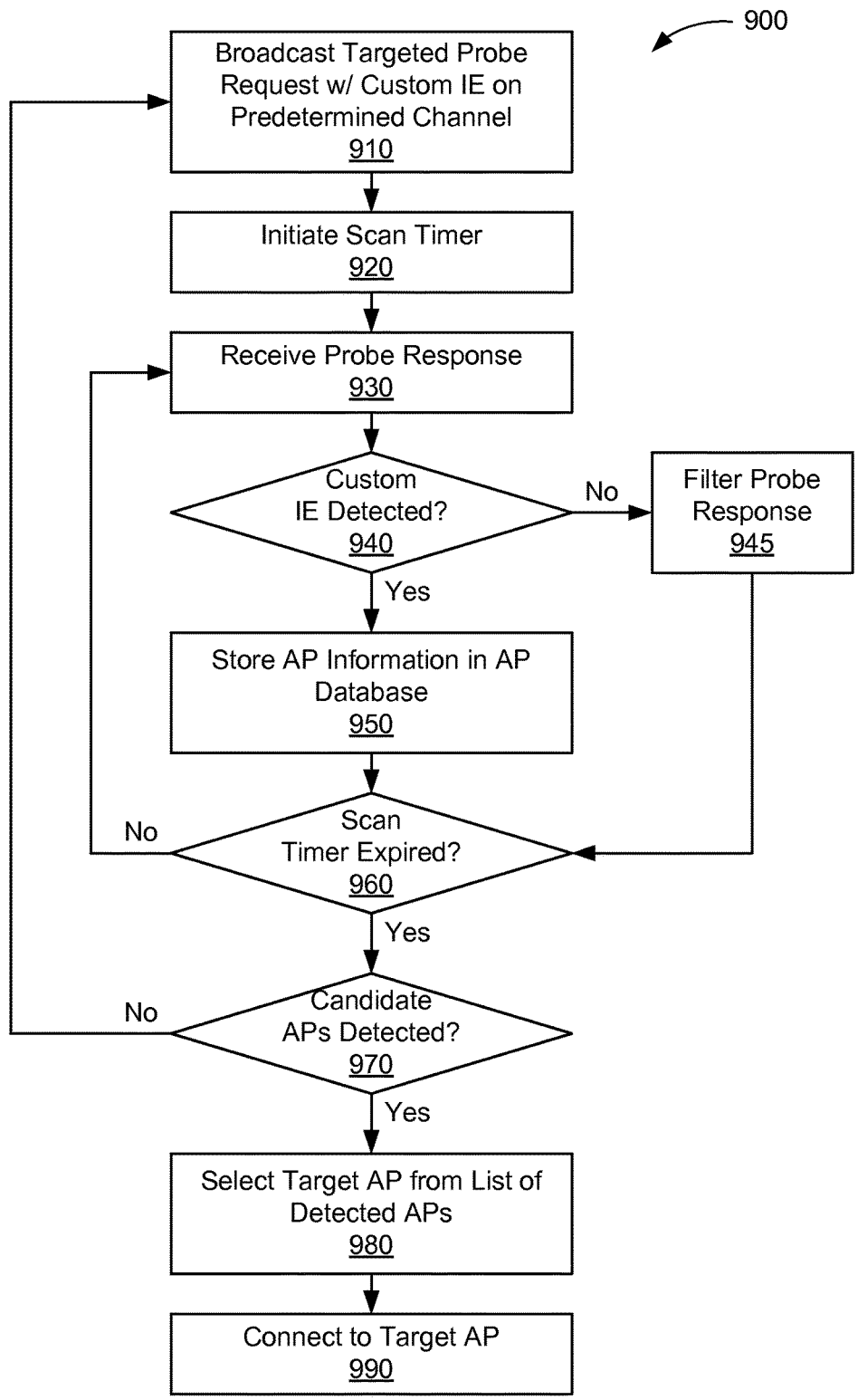
FIG. 9 shows a flowchart depicting a more detailed example of a filtered scanning operation.

FIG. 9 shows a flowchart depicting a more detailed example of a filtered scanning operation 900. With reference, for example, to FIG. 6, the operation 900 may be performed by the STA 600 to identify a set of candidate APs, and to select a target AP to connect to from the set of candidate APs.

The STA 600 initiates the filtered scanning operation 900 by broadcasting a targeted probe request with a custom IE on a predetermined channel (910). For example, the processor 620 may execute the filtered scanning module 634 to generate the targeted probe request by writing a unique set of information (e.g., such as the MAC address of the STA 600) in the VSIE field of an outgoing probe request. In example embodiments, the processor 620, in executing the filtered scanning module 634, may cause transceiver 610 to broadcast the targeted probe request on a predetermined channel (e.g., the channel that the target AP is expected to reside on).

The STA 600 may initiate a scan timer upon broadcasting the targeted probe request (920). For example, the filtered scanning module 634, as executed by the processor 620, may cause the STA 600 to continually listen for probe responses for a given duration (e.g., until expiration of the scan timer). The scan timer may be configured to limit the amount of time the STA 600 listens for probe responses before attempting to re-scan the wireless channel (e.g., if no targeted probe response is received before expiration of the scan timer). Additionally, and/or alternatively, the scan timer may be configured to ensure that the STA 600 continues listening for probe responses for a duration long enough to ensure that the STA 600 receives a targeted probe response from any available (and capable) AP within wireless range of the STA 600.

Upon receiving a probe response (930), the STA 600 may first determine whether the probe response includes a custom IE (940). For example, the processor 620 may execute the response filtering module 636 to compare the information contained in the VSIE field (if available) of the incoming probe response with the information contained in the VSIE field of the targeted probe request. If the VSIE field of the incoming probe response does not match the VSIE field of the targeted probe request (e.g., the custom IE is not detected), the STA 600 may filter the probe response (945). Specifically, the processor 620, in executing the response filtering module 636, may ignore the incoming probe response, thus ensuring that the AP that sent the probe response is not available for consideration during a subsequent AP selection process. In example embodiments, the probe response filtering may be performed in firmware.

If the STA 600 detects a custom IE in the probe response that matches or mirrors the custom IE of the targeted probe request, the STA 600 may store information pertaining to the corresponding AP in a database of candidate APs (950). For example, the processor 620, in executing the response filtering module 636, may store the received probe response (e.g., and/or information provided therewith) in the AP database 632. This process of receiving and selectively storing incoming probe responses (930-950) may be repeated for as long as the scan timer has not yet expired (960).

Once the scan timer expires, the STA 600 may determine whether any candidate APs have been detected (970). For example, the processor 620 may execute the AP selection module 638 to determine whether the AP database 632 contains stored information from one or more received probe responses (e.g., targeted probe responses). If no candidate APs are detected, the STA 600 may re-broadcast the targeted probe request (910) to initiate another scanning operation 900. However, if the STA 600 identifies at least one candidate AP, the STA 600 may then select a particular AP from the set of candidate APs as the target AP (980). For example, the processor 620, in executing the AP selection module 638, may select an AP from the AP database 632 that is best suited to the needs of the STA 600 (e.g., such as the AP with the highest signal strength).

Finally, the STA 600 may proceed to establish a Wi-Fi connection with the target AP STA (990). As described above, the STA 600 may first authenticate to the target AP by sending an authentication request to, and receiving an authentication response back from, the target AP. The STA 600 may then associate to the target AP by sending an association request to, and receiving an association response back from, the target AP. The STA 600 may then complete the connection process by performing a 4-way handshake (e.g., by exchanging EAPoL frames) with the target AP.

Figure 10:
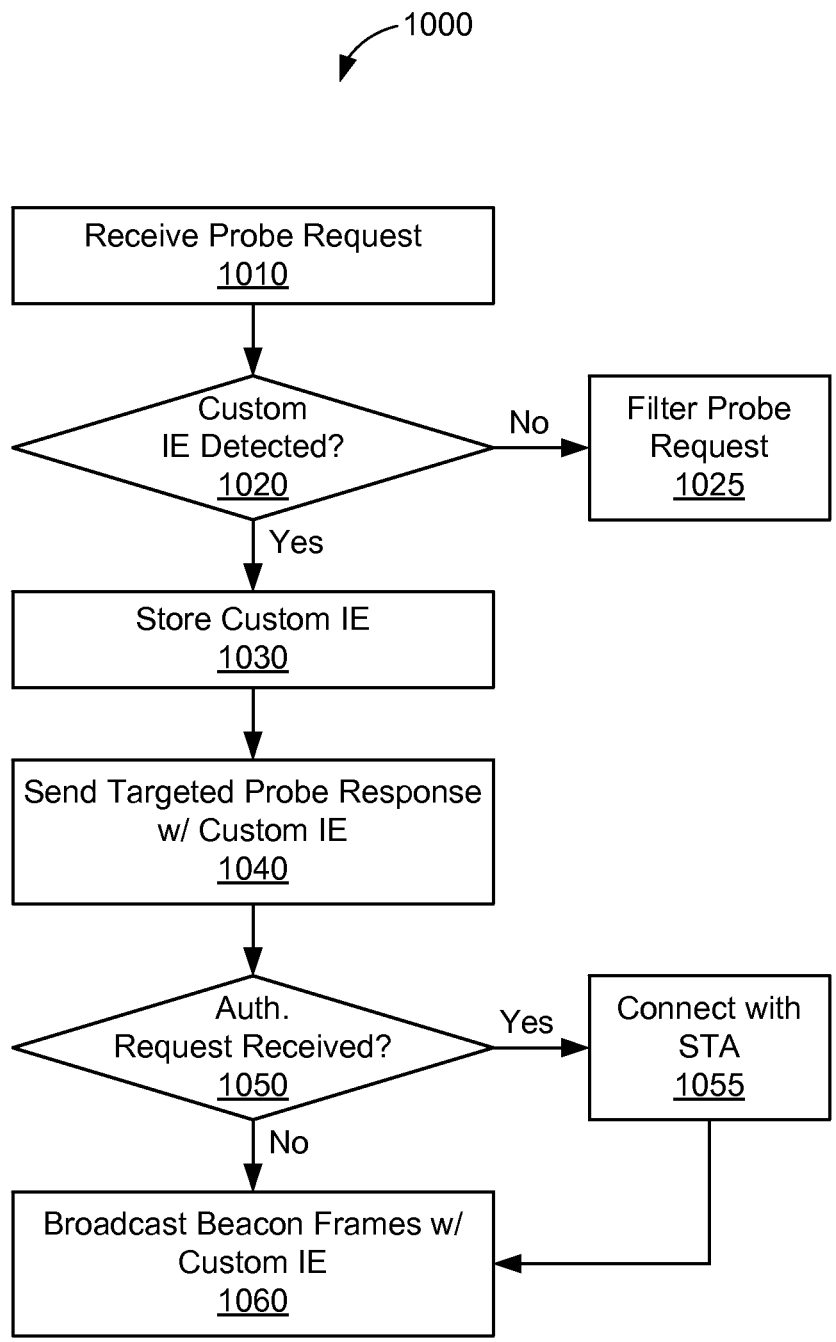
FIG. 10 shows a flowchart depicting an operation of an AP in accordance with example embodiments.

FIG. 10 shows a flowchart depicting an operation 1000 of an AP in accordance with example embodiments. With reference, for example, to FIG. 7, the operation 1000 may be performed by the AP 700 to establish a Wi-Fi connection with a particular STA and/or with a particular type of wireless device.

The AP 700 receives an incoming probe request (1010) and determines whether the probe request includes a custom IE (1020). For example, the processor 720 may execute the request filtering module 734 to analyze the information contained in the VSIE field (if available) of the incoming probe request. The request filtering module 734, as executed by the processor 720, may parse the VSIE field for information that is unique to the requesting STA (e.g., such as a MAC address of the STA) and/or other information indicating that the AP 700 is an intended target of a filtered scanning operation (e.g., as described above with respect to FIG. 9). If the VSIE field is empty and/or is not indicative of a custom IE, the AP 700 may filter the probe request (1025). Specifically, the processor 720, in executing the request filtering module 734, may ignore the incoming probe request (e.g., without analyzing any additional information included in the probe request) and refrain from sending a probe response back to the requesting STA. In example embodiments, the probe request filtering may be performed in firmware.

If the AP 700 detects a custom IE in the probe request, the AP 700 may store information provided within the custom IE in a custom IE database (1030). For example, the processor 720, in executing the request filtering module 734, may store the received probe request (e.g., and/or information provided in the VSIE field of the probe request) in the custom IE store 732. The AP 700 then sends a targeted probe response with a matching custom IE back to the requesting STA (1040). For example, the processor 720 may execute the probe synchronization module 736 to generate a probe response with a VSIE field containing information that matches or mirrors the information contained in the VSIE field of the received probe request (e.g., as stored in the custom IE store 732).

After sending the targeted probe response, the AP 700 listens for an authentication request from the requesting STA (1050). If the AP 700 receives an authentication request, the AP 700 may proceed to establish a Wi-Fi connection with the corresponding STA (1055). For example, the AP 700 may respond to the authentication request by sending an authentication response back to the STA. The AP 700 may then receive an association request and send an association response back to the STA. Finally, the AP 700 may complete the connection process by performing a 4-way handshake (e.g., by exchanging EAPoL frames) with the STA.

Once the AP 700 is connected to the requesting STA, the AP 700 may subsequently (and periodically) broadcast beacon frames with the STA's custom IE (1060). For example, the processor 720 may execute the beacon synchronization module 738 to generate beacon frames with a VSIE field containing information that matches or mirrors the information contained in the VSIE field of the received probe request (e.g., as stored in the custom IE store 732). For example, the custom IE included in the beacon frame may enable the STA to identify the AP 700 during passive scanning operations. For example, the beacon frames may enable the STA to maintain a Wi-Fi connection with the AP 700, and to quickly reconnect to the AP 700 in the event that the devices become disconnected.

In example embodiments, the AP 700 may generate beacon frames that include the custom IE even if the AP 700 does not establish a Wi-Fi connection with the requesting STA. As described above, this may enable the STA to quickly identify the AP 700 (e.g., through passive scanning) and to establish a Wi-Fi connection with the AP 700 if (and when) needed.

In the foregoing specification embodiments have been described with reference to specific examples. It will, however, be evident that various modifications and changes may be made thereto without departing from the broader scope of the disclosure as set forth in the appended claims. For example, the method steps depicted in the flow charts of FIGS. 8-10 may be performed in other suitable orders, multiple steps may be combined into a single step, and/or some steps may be omitted (or further steps included). The specification and drawings are, accordingly, to be regarded in an illustrative sense rather than a restrictive sense.

What is claimed is:

1. A method of connecting a wireless station (STA) to an access point (AP), the method being performed by the STA and comprising:
broadcasting a probe request that includes a custom information element (IE), wherein the probe request is broadcast only on a predetermined channel that is associated with a target AP and stored in the STA;
receiving probe responses from one or more APs in response to the probe request;
identifying a set of candidate APs based on one or more of the received probe responses that include a custom IE that matches the custom IE broadcast in the probe request;
selecting the target AP from the set of candidate APs;
connecting to the target AP; and
ignoring probe responses that do not include the custom IE broadcast in the probe request.

2. The method of claim 1, wherein the custom IE is a vendor-specific IE including a media access control (MAC) address of the target AP.

3. The method of claim 1, wherein the target AP is to respond to the probe request by sending a probe response that includes the custom IE.

4. The method of claim 1, further comprising:
initiating a timer upon broadcasting the probe request; and
in response to none of the received probe responses including the custom IE upon expiration of the timer, rebroadcasting the probe request with the custom IE.

5. The method of claim 1, further comprising:
receiving a beacon frame from the target AP, wherein the beacon frame includes the custom IE
identifying wherein selecting the target AP is based at least in part on the received beacon frame.

6. A communications device, comprising:
a memory element storing instructions for connecting to an access point (AP); and
one or more processors that, upon executing the instructions, cause the communications device to:
broadcast a probe request that includes a custom information element (IE), wherein the probe request is broadcast only on a predetermined channel that is associated with a target AP and stored in the memory;
receive probe responses from one or more APs in response to the probe request;

identify a set of candidate APs based on one or more of the received probe responses that include a custom IE that matches the custom IE broadcast in the probe request;

select the target AP from the set of candidate APs;

connect to the target AP; and ignore probe responses that do not include the custom IE broadcast in the probe request.

7. The communications device of claim 6, wherein the custom IE is a vendor-specific IE including a media access control (MAC) address of the target AP.

8. The communications device of claim 6, wherein the target AP is to respond to the probe request by sending a probe response that includes the custom IE.

9. The communications device of claim 6, wherein execution of the instructions further causes the communications device to:

initiate a timer upon broadcasting the probe request; and in response to none of the received probe responses including the custom IE upon expiration of the timer, rebroadcast the probe request with the custom IE.

10. The communications device of claim 6, wherein execution of the instructions further causes the communications device to:

receive a beacon frame from the target AP, wherein the beacon frame includes the custom IE wherein selecting the target AP based is at least in part on the received beacon frame.

11. A communications device, comprising:

means for broadcasting a probe request that includes a custom information element (IE), wherein the probe request is broadcast only on a predetermined channel that is associated with a target AP and stored in the communications device;

means for receiving probe responses from one or more access points (APs) in response to the probe request;

means for identifying a set of candidate APs based on one or more of the received probe responses that include a custom IE that matches the custom IE broadcast in the probe request;

means for selecting the target AP from the set of candidate APs;

means for connecting to the target AP; and means for ignoring probe responses that do not include the custom IE broadcast in the probe request.

12. The communications device of claim 11, wherein the custom IE is a vendor-specific IE including a media access control (MAC) address of the target AP.

13. The communications device of claim 11, wherein the target AP is to respond to the probe request by sending a probe response that includes the custom IE.

14. The communications device of claim 11, further comprising:

means for initiating a timer upon broadcasting the probe request; and means for rebroadcasting the probe request with the custom IE in response to none of the received probe responses including the custom IE upon expiration of the timer.

15. The communications device of claim 11, further comprising:

means for receiving a beacon frame from the target AP, wherein the beacon frame includes the custom IE wherein the means for selecting the target AP is based at least in part on the received beacon frame.

16. A non-transitory computer-readable storage medium containing program instructions that, when executed by a processor of a communications device, causes the communications device to:

broadcast a probe request that includes a custom information element (IE), wherein the probe request is broadcast only on a predetermined channel that is associated with a target AP and stored in the storage medium;

receive probe responses from one or more access points (APs) in response to the probe request;

identify a set of candidate APs based on one or more of the received probe responses that include a custom IE that matches the custom IE broadcast in the probe request;

select the target AP from the set of candidate APs;

connect to the target AP; and ignore probe responses that do not include the custom IE broadcast in the probe request.

17. The non-transitory computer-readable storage medium of claim 16, wherein the custom IE is a vendor-specific IE including a media access control (MAC) address of the target AP.

18. The non-transitory computer-readable storage medium of claim 16, wherein execution of the instructions further causes the communications device to:

initiate a timer upon broadcasting the probe request; and in response to none of the received probe responses including the custom IE upon expiration of the timer, rebroadcast the probe request with the custom IE.

\* \* \* \* \*